(12) United States Patent
Tanner

(10) Patent No.: US 7,762,471 B2
(45) Date of Patent: Jul. 27, 2010

(54) PROXIMITY PAYMENT CARD WITH COST-EFFECTIVE CONNECTION BETWEEN USER-ACTUATABLE INPUT SWITCH AND RFID IC

(75) Inventor: Colin Tanner, Middlesex (GB)

(73) Assignee: Mastercard International, Inc., Purchase, NY (US)

( * ) Notice: Subject to any disclaimer, the term of this patent is extended or adjusted under 35 U.S.C. 154(b) by 438 days.

(21) Appl. No.: 11/517,072

(22) Filed: Sep. 7, 2006

(65) Prior Publication Data
US 2008/0061148 A1    Mar. 13, 2008

(51) Int. Cl.
G06K 19/06    (2006.01)

(52) U.S. Cl. ............... 235/492; 235/375; 235/380

(58) Field of Classification Search ........ 235/375, 235/380, 492, 572.3, 572.7, 572.8; 340/572.3, 340/572.7, 572.8
See application file for complete search history.

(56) References Cited

U.S. PATENT DOCUMENTS

| | | | | |
|---|---|---|---|---|
| 4,882,473 A | * | 11/1989 | Bergeron et al. | 463/25 |
| 5,276,311 A | * | 1/1994 | Hennige | 235/380 |
| 6,343,744 B1 | * | 2/2002 | Shibata et al. | 235/492 |
| 6,412,702 B1 | * | 7/2002 | Ishikawa et al. | 235/492 |
| 6,863,220 B2 | | 3/2005 | Selker | |
| 2003/0132301 A1 | * | 7/2003 | Selker | 235/487 |
| 2004/0124248 A1 | * | 7/2004 | Selker | 235/492 |
| 2005/0077349 A1 | | 4/2005 | Bonalle et al. | |
| 2005/0258245 A1 | * | 11/2005 | Bates et al. | 235/451 |

* cited by examiner

*Primary Examiner*—Karl D. Frech
(74) *Attorney, Agent, or Firm*—Buckley, Maschoff & Talwalkar LLC

(57) ABSTRACT

An identification token includes a body and an RFID IC embedded in the body. The RFID IC includes a first terminal and a second terminal. An antenna is also embedded in the body and is coupled between the terminals of the RFID IC to form two connections between the RFID IC and the antenna. A user-actuatable switch is supported by the body and has two different states. The switch is coupled to at least one of the terminals of the RFID IC. The connections between the RFID IC and the antenna are uninterrupted when the switch is in either state. The switch is not coupled to the RFID IC by any terminal other than the two terminals by which the antenna is coupled to the RFID IC.

23 Claims, 4 Drawing Sheets

PROXIMITY PAYMENT CARD WITH COST-EFFECTIVE CONNECTION BETWEEN USER-ACTUATABLE INPUT SWITCH AND RFID IC

BACKGROUND

It has been proposed (e.g., in U.S. Pat. No. 6,863,220) to include a user-actuatable switch in a proximity payment card. In the card proposed in the '220 patent, the switch is connected to interrupt the circuit formed by the card antenna and the card radio frequency identification (RFID) integrated circuit (IC). The switch is normally open to disable the card; when the cardholder actuates the switch, the circuit that includes the antenna and the RFID IC is completed so that the card may be activated by presenting the card to a point of sale terminal.

It may be contemplated to configure a proximity payment card with a user-actuatable switch in such a way that the switch provides an input signal to the RFID IC, rather than simply allowing the card to receive an interrogation signal. If such a switch configuration is undertaken, however, it would be advantageous to do so in a manner which minimizes the manufacturing cost for the card.

DETAILED DESCRIPTION

In general, and for the purpose of introducing concepts of embodiments of the present invention, a user-actuatable switch is incorporated in a proximity payment card and is connected to the RFID IC of the card in such a way that the switch provides an input signal to the RFID IC while the RFID IC need not have any more terminals than the two terminals conventionally used to couple the RFID IC to the card antenna. This may provide a cost-effective way of incorporating a user interface into the card.

In some embodiments, one or more user-actuatable switches are connected across the antenna (i.e., between the two antenna terminals of the RFID IC). In addition or alternatively, one or more user-actuatable switches may be connected in parallel to a conductive connection between one of the terminals and the antenna. Closing of the switch (or of each switch, if there are more than one) changes one or more electrical characteristics of the antenna circuit. The RFID IC may include circuitry to sense one or more characteristics of the antenna circuit, or changes in such characteristic(s), thereby allowing the RFID IC to sense when the (a) switch is actuated.

Figure 1:
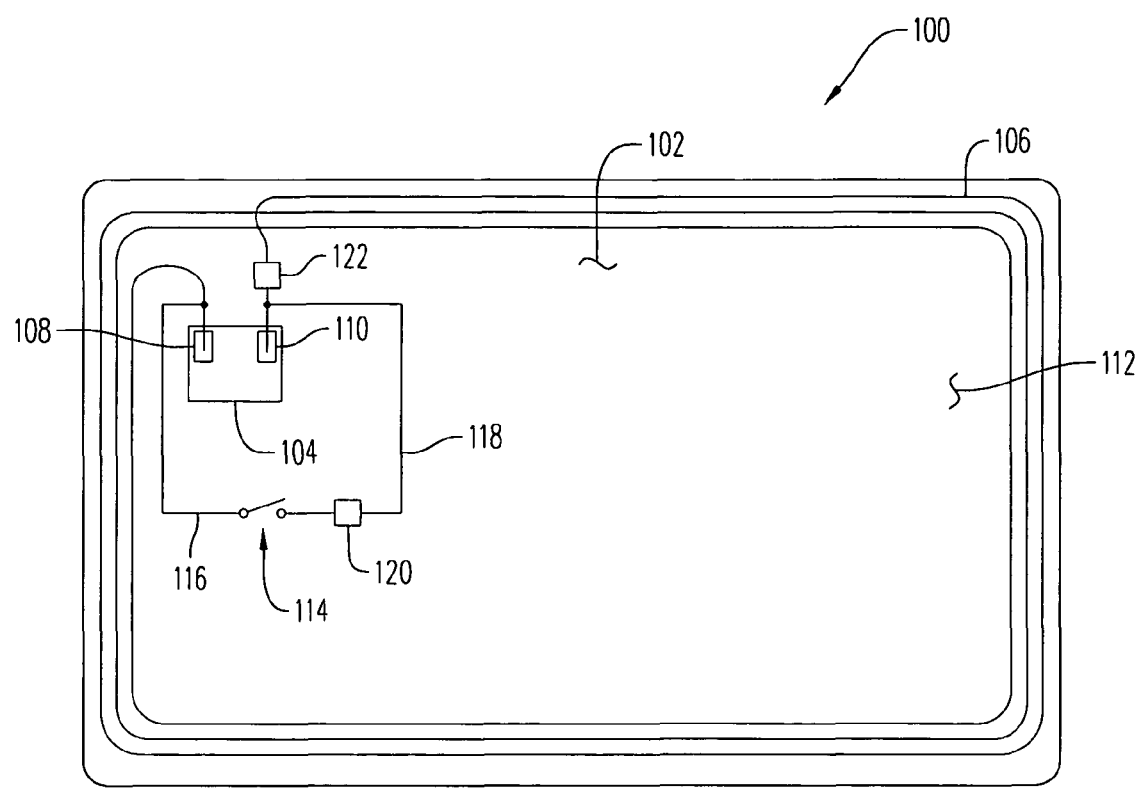
FIG. 1 is a schematic plan view of a proximity payment card according to some embodiments.

FIG. 1 is a schematic plan view of a proximity payment card 100 according to some embodiments. The proximity payment card 100 may include a card-shaped body 102, which may resemble conventional payment cards in shape and size. The card-shaped body 102 may be formed of plastic or another suitable material.

The proximity payment card 100 may also include an RFID IC 104. The RFID IC 104 may be mounted and/or installed in any suitable manner in the card-shaped body 102. For example, the RFID IC 104 may be embedded (partially or completely) in the card-shaped body 102. The RFID IC 104 may be suitably designed and configured to transmit payment card account information by radio frequency signaling to a POS terminal. In general, the RFID IC 104 may be designed and configured to operate in accordance with the "PayPass" standard promulgated by MasterCard International Incorporated, the assignee hereof.

The proximity payment card 100 may further include an antenna 106 embedded in or otherwise mounted on the card-shaped body 102. As shown, the antenna 106 may be in the form of several loops arranged along the periphery of the card-shaped body. Alternatively, the antenna 106 may be of a different type and/or configuration. The antenna may be operative generally in accordance with the above-mentioned PayPass standard to receive interrogation and power signals (which may be the same signal) from a proximity coupling device of a POS terminal and to transmit payment card account number information and/or other information to the proximity coupling device.

Returning to the RFID IC 104, it will be noted that it includes terminals 108, 110 by which the RFID IC 104 is electrically conductively connected to the antenna 106.

In some embodiments, lettering (not shown) or other symbols (not shown) may be present on the front surface 112 of the card-shaped body 102 and/or on the rear surface (not shown) of the card-shaped body 102. The proximity payment card 100 may have one or more magnetic stripes (not shown) on the card-shaped body 102 to allow the proximity payment card 100 to be read by a magnetic card reader. In addition, or alternatively, there may be embossed numbers and/or letters on the card-shaped body to indicate one or more account numbers and/or the name of the holder of the proximity payment card 100. In addition, or alternatively, non-embossed printing on the front surface 112 may indicate the account numbers and/or the holder's name. Still further, the front surface 112 of the card-shaped body 102 may carry one or more logos and/or brands, including for example the brand/logo of a national payment card association such as MasterCard International Incorporated. The brand/logo of the issuer may also be present, as well as, for example, a specific card product brand. Other conventional features that may be present on the proximity payment card 100 (though such features are not shown) are an adhesive paper strip to receive the signature of the cardholder, and a security code or the like printed on the adhesive strip.

The proximity payment card 100 may also include a user-actuatable switch 114 that is mounted on, partially or completely embedded in, or otherwise supported by the card-shaped body 102. The switch 114 may be coupled to the terminals 108, 110 of the RFID IC by electrically conductive signal paths 116, 118. The hollow square 120 represents electrical characteristics (one or more of resistance, capacitance and inductance) of the circuit path formed when the switch 114 is actuated (closed). Similarly the hollow square 122 represents electrical characteristics of the antenna 106 and its circuit path.

In some embodiments, the switch 114 may be a pressure sensitive device such as the type of switch described in co-pending commonly-assigned patent application Ser. No. 11/503,197, filed Aug. 11, 2006. Other types of switches may alternatively be used. As is typical with user-actuatable switches for electronic devices, user actuation may change over the switch from a first state in which the switch is open (substantially non-conducting) to a second state in which the switch is closed (at least partially conducting). It will be recognized from the circuit topology shown in FIG. 1 that the connections between the RFID IC 104 and the antenna 106 are uninterrupted irrespective of whether the switch 114 is open or closed. It will also be recognized that the switch 114 is coupled to the RFID IC 110 only by the terminals 108, 110. In this embodiment, RFID IC 104 has only two terminals (108, 110), but nevertheless a user interface is provided with the switch 114, in addition to allowing connection of the antenna 106 to the RFID IC 104 via the terminals 108, 110.

In operation, the user presents the proximity payment card 100 to a point of sale terminal (not shown) while actuating the switch 114. The RFID IC is powered up by an interrogation signal from the POS terminal (more specifically from a proximity coupling device included in the POS terminal). The RFID IC 104 detects a characteristic and/or a change in characteristic of the circuitry connected to the terminals 108, 110 to detect that the switch 114 is actuated. In response to the actuation of the switch 114, the RFID IC 104 takes an action that it would not have taken but for the actuation of the switch 114. Thus, the RFID IC 104 may be said to have taken an action in response to actuation of the switch 114. For example, the RFID IC 104 may store two different payment card account numbers, and may output (transmit) one of the account numbers, in response to actuation of the switch 114, at a time when the proximity payment card is being interrogated by a point of sale terminal. If the switch 114 is not actuated at a time when the proximity payment card is being interrogated, the RFID IC may output the other one of the two account numbers.

As another example, the actuation of the switch may be required for operation of the proximity payment card. That is, in such embodiments, the RFID IC 104, although powered by an interrogation signal received via the antenna 106, operates to transmit the account number only if the RFID IC 104 detects that the switch 114 is being actuated. In some embodiments, not only may the RFID IC 104 refrain from transmitting the account number when the switch 114 is not actuated, but further, when the switch is not actuated the RFID IC may remain "mute", i.e., may transmit no signal whatsoever in response to an interrogation signal.

Figure 2:
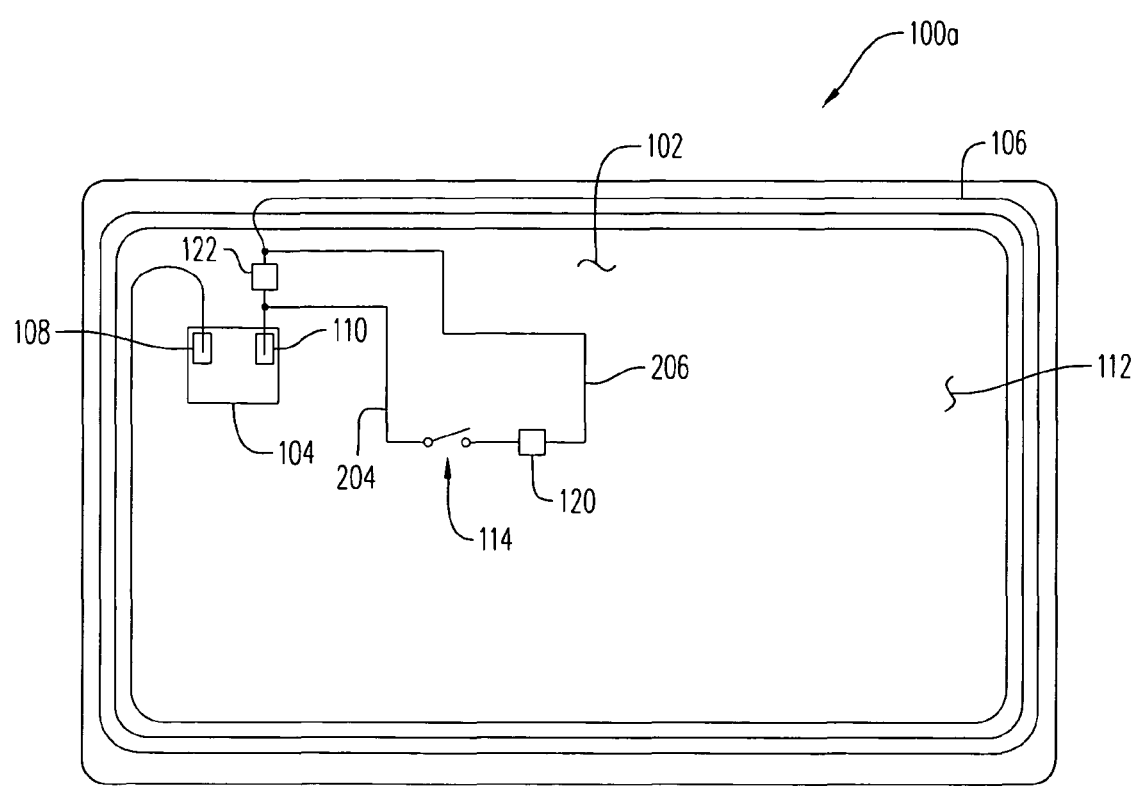
FIG. 2 is a schematic plan view of a proximity payment card according to some other embodiments.

FIG. 2 is a schematic plan view of a proximity payment card (reference numeral 100a) according to some other embodiments.

The proximity payment card 100a of FIG. 2 may have substantially the same card body 102, RFID IC 104 and antenna 106 as described above with reference to the proximity payment card 100 of FIG. 1. The proximity payment card 100a may also include the same or a similar switch 114 as described above. However, instead of being connected across the antenna 106 (across the terminals 108, 110) as in FIG. 1, the switch 114 in the embodiment of FIG. 2 is connected in parallel with a connection 202 between the terminal 110 and the antenna 106. In particular, the switch 114 is coupled to the terminal 110 by an electrically conductive path 204 and is coupled to the antenna 106 by an electrically conductive path 206. (As used herein and in the appended claims a device such as a switch is "coupled" to a terminal if connected thereto by an electrically conductive path and/or by one or more resistors, inductors and/or capacitors, but not if the RFID IC or the antenna is between the device and the terminal.) The proximity payment card 100a may operate in substantially the same manner as the proximity payment card 100.

Figure 3:
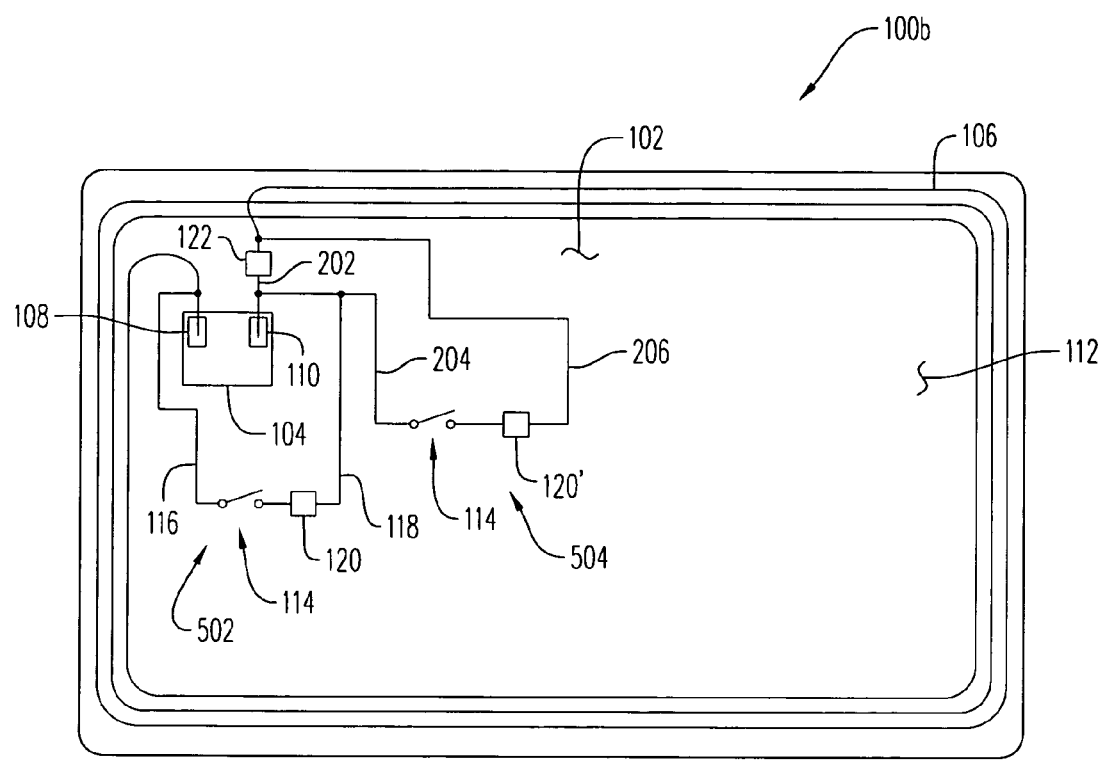
FIG. 3 is a schematic plan view of a proximity payment card according to still other embodiments.

FIG. 3 is a schematic plan view of a proximity payment card (reference numeral 100b) according to still other embodiments.

The proximity payment card 100b of FIG. 3 may have substantially the same card body 102, RFID IC 104 and antenna 106 as described above with reference to FIG. 1. Further, the proximity payment card 100b may have two switches 114 of the kind or kinds described above, with one of the switches connected across the antenna, as indicated at 502 (as in the proximity payment card 100 of FIG. 1) and with the other switch connected in parallel with the connection 202 between the terminal 110 and the antenna 106, as indicated at 504 (as in the proximity payment card 100a of FIG. 2). The electrical characteristic(s) 120 of the conductive path completed by one of the switches (when closed) may be different from one or more of the electrical characteristic(s) 120' of the conductive path completed by the other one of the switches (when closed) and/or may be distinguishable by the RFID IC as a result of the circuit topology. The RFID IC includes circuitry (not separately shown) that allows the RFID IC to detect actuation of each of the switches 114 and to distinguish between actuation of one of the switches and actuation of the other one of the switches. For example, the RFID IC may include circuitry to detect one or more characteristics of the circuitry (outside the RFID IC) that is coupled to the terminals 108, 110.

In operation of the proximity payment card 100b, the user presents the card to a point of sale terminal while actuating the one of the switches. The RFID IC is powered up by an interrogation signal from the POS terminal (more specifically from a proximity coupling device included in the POS terminal). The RFID IC 104 detects a characteristic and/or a change in characteristic of the circuitry connected to the terminals 108, 110 to detect whether one of the switches has been actuated and, if so, which one of the switches has been actuated. In response to detection of actuation of a particular one of the switches, the RFID IC may take an action called for by actuation of that switch. For example, the RFID IC may store two different payment card account numbers, and may output (transmit) a first one of the account numbers if it detects that a first one of the switches is actuated, but would output the second account number if it detects that the other one of the switches is actuated, and would not output either account number if neither switch is actuated. In another embodiment, the RFID IC may store three account numbers and may output the first account number if only one switch is actuated, output the second account number if only the other switch is actuated, output the third account number if both switches are actuated, and output no account number if neither switch is actuated. In still another embodiment, the RFID IC may store four account numbers and may output the first account number if only one switch is actuated, output the second account number if only the other switch is actuated, output the third account number if both switches are actuated, and output the fourth account number if neither switch is actuated.

In each of the card embodiments described above, two or more parallel-connected user-actuatable switches may be substituted for any one of the user-actuatable switches 114 shown in FIGS. 1-3. When parallel-connected switches are provided, each of the parallel-connected paths may be arranged to have mutually different electrical characteristics to allow the RFID IC to determine which one of the parallel connected switches (if any) is currently actuated.

Figure 4:
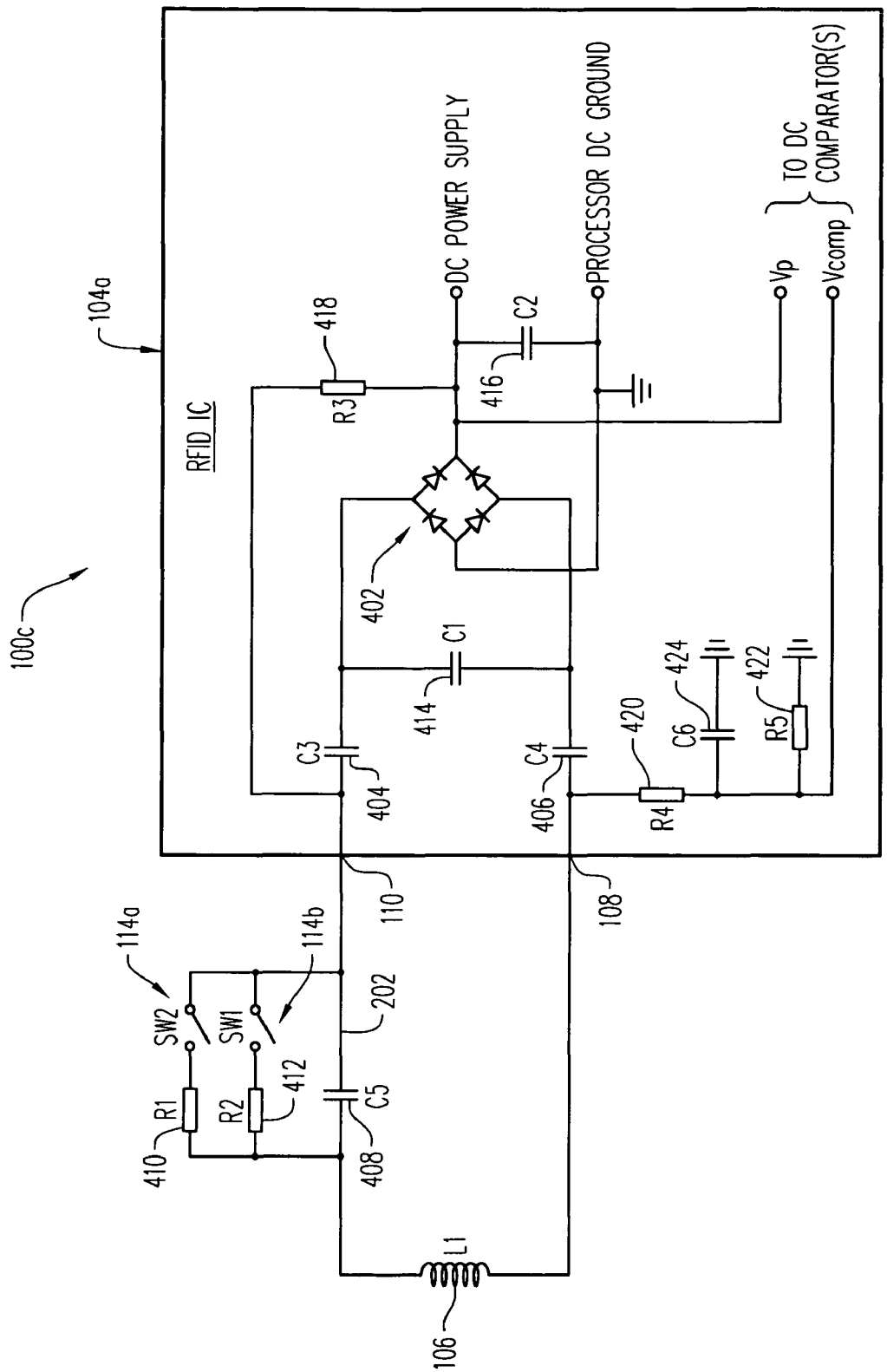
FIG. 4 is a schematic circuit diagram of electrical and electronic components of yet another embodiment of a proximity payment card.

FIG. 4 is a representation of a circuit diagram of electrical and electronic components of yet another embodiment of a proximity payment card (reference numeral 100c). The card-shaped body of the proximity payment card 100c is not indicated in the drawing but may nevertheless be present along with other features of the proximity payment cards described above. In the embodiment of FIG. 4, two parallel-connected switches are provided between one of the RFID IC terminals (i.e., terminal 110 in this embodiment) and antenna 106, and are both parallel to a connection 202 between the antenna 106 and the terminal 110.

The RFID IC 104a includes a rectifier bridge 402 to convert an AC power/interrogation signal received via the antenna 106 to a DC power level. The rectifier bridge 402 is coupled to the antenna 106 by capacitors C3 (reference numeral 404) and C4 (reference numeral 406)—which may both be part of the RFID IC 104a—and capacitor C5 (reference numeral 408)—which may be part of the connection 202 between the antenna 106 and the terminal 110. One of the switches (114a) may be connected in series with a resistor R1 (reference numeral 410) across the capacitor 408 and the other switch (114b) may be connected in series with a resistor R2 (reference numeral 412) across the capacitor 408. The capacitors C3, C4, C5 block DC signals but present a low impedance to RF signals such as the power/interrogation signal. The RFID IC 104a also includes a capacitor C1 (reference numeral 414) connected across the rectifier bridge 402 to tune the antenna 106 to a resonant frequency $F_c$ which matches the frequency of the expected power/interrogation signal. Further, the RFID IC 104a includes a capacitor C2 (reference numeral 416) connected across the DC power level tap and ground tap of the rectifier bridge 402 to smooth the RF ripple from the DC power level provided by the rectifier bridge 402.

In addition, the RFID IC 104a includes a resistor R3 (reference numeral 418) which is connected between terminal 110 and the DC power tap of the rectifier bridge 402. Resistor R3 may have a sufficiently high value so as not to spoil the Q factor of the circuit/antenna 106. Still further, the RFID IC 104a may include resistors R4 (reference numeral 420) and R5 (reference numeral 422) connected in series between terminal 108 and ground. Also, the RFID IC 104a may include a capacitor C6 (reference numeral 424) connected between the junction of resistors R4 and R5 and ground. Capacitor C6 may function to remove RF ripple. Resistor R4 isolates resistor R5 and capacitor C6 from the RF circuit that includes antenna 106 so as not to spoil the Q factor.

The switched resistors R1, R2 form a voltage divider with resistors R4, R5.

The electrical components shown in FIG. 4 may in at least some cases represent inherent circuit properties and need not always be constituted by discrete components.

A divider voltage level $V_{comp}$ is taken out from the junction of resistors R4, R5 and provided with the DC level $V_p$ from the DC tap of the rectifier bridge 402 for comparison between the two levels at one or more comparators (not separately shown) on the RFID IC.

With both switches 114a, 114b open, $V_{comp}=0$, whatever the level of DC provided by the rectifier bridge.

With switch 114b closed, $$V_{comp}=(V_p*R5)/(R3+R2+R4+R5).$$

With switch 114a closed, $$V_{comp}=(V_p*R5)/(R3+R1+R4+R5).$$

It will be appreciated that the values of R1 and R2 may be selected so that $V_{comp}$ varies depending on which switch is actuated. That is R1 and R2 may have substantially different values.

It should be understood that it is not necessarily the case that every component described herein or shown on FIG. 4 is necessarily present as a separate component. For example, some of the indicated components may be combined.

Conventional data storage and/or processing circuitry may also form a part of the RFID IC but is not separately shown.

Operation of the proximity payment card 100c may be similar to that of proximity payment card 100b described above.

In one or more of the above-described embodiments a respective dimple or the like (not shown) may be incorporated in an outer layer of the card to indicate the location of each switch 114 and to provide tactile feedback as to actuation of the switch. Another sort of indication of the location of the switch, such as a printed indication, may also or alternatively be provided on an outer layer of the card.

By using only the two antenna terminals of the RFID IC (or only one of such terminals) to interface one or more user-actuated switches to the RFID IC, it is possible to use the switch(es) as input device(s) to the RFID IC without increasing the number of terminals on the RFID IC above the conventional number of two. Thus the increased functionality potentially available with one or more user-actuated switches on the payment card need not require a substantial increase in cost in the RFID IC.

It should be understood that in practice the RFID IC may be part of an RFID module that includes a module body (not separately shown) in/on which the RFID IC is mounted, with the module body subsequently to be installed in the card body to attach the RFID IC to the antenna.

Embodiments have heretofore been described with reference to a card-shaped proximity payment device, but the teachings disclosed herein are also applicable to proximity payment devices which are not card-shaped. As used herein and in the appended claims, "proximity payment device" refers to any device, whether or not card shaped, which transmits to a point of sale terminal, by wireless transmission, a payment account number.

Although not indicated in the drawings, one or more of the proximity payment devices may have a contact interface like that of a conventional smart card that includes a contact interface.

The principles taught herein have heretofore been described in the context of proximity payment devices. Nevertheless, these teachings are also applicable to cards or the like issued by transportation systems (e.g., mass transit systems) for access to the transportation systems; to cards used to identify the holder for purposes apart from or in addition to transaction payments; and to so-called electronic passports (also known as RFID-enabled passports). As used herein and in the appended claims the term "identification token" refers to an object that serves as one or more of a proximity payment device, a transportation card, an identification card and/or an RFID-enabled passport. The term "transportation card" refers to a card or similar device used to pay, or confirm or evidence payment of, a charge for using a transportation system. The term "RFID-enabled passport" refers to an internationally recognized travel document that includes an IC and an antenna and communicates with a terminal by a wireless communication technique.

The above description and/or the accompanying drawings are not meant to imply a fixed order or sequence of steps for any process referred to herein; rather any process may be performed in any order that is practicable, including but not limited to simultaneous performance of steps indicated as sequential.

The proximity payment cards described herein may be considered to be a sort of contactless smart card. The teachings of this application are thus applicable to contactless smart cards generally, as well as to so-called "dual interface" smart cards, which contain a set of contacts on a surface of the card to allow for direct contact interface to a terminal. "Dual interface" smart cards also include an antenna to allow for interfacing to a terminal by wireless transmission of signals.

As used herein and in the appended claims, the term "embedded" includes both completely and partially embedded. For the purposes of the appended claims, a given device is to be considered coupled "directly" between two terminals if there is a respective series connection from the device to each of the two terminals such that neither respective series connection includes a user-actuatable switch. Although the embodiments illustrated herein all include an antenna coupled directly between two RFID IC terminals, in alternative embodiments an additional user-actuatable switch may be positioned to interrupt the connection between the antenna and one of the RFID terminals. Further, although all of the embodiments illustrated herein feature an RFID IC having only two terminals, in alternative embodiments the RFID IC may have three or more terminals.

Actuation of the user-actuatable switches referred to herein may be accomplished in a number of ways. For example, in some embodiments, the switch should be pressed and held in order to obtain a given action (e.g., transmission of the account number) from the RFID IC. Alternatively, the switch may be pressed and let go to obtain the desired action. In other embodiments, the switch may be pressed several times in sequence to obtain certain results. For example, one "click" of the switch may cause the RFID IC to transmit a first account number, whereas two clicks of the switch may cause the RFID to transmit a second, different account number.

In still other embodiments, where two or more user-actuatable switches are included, the switches may be clicked a particular number of times in a particular order to obtain a desired result. Thus user activity in the nature of entering a combination may be required. For example, in order to cause the RFID IC to transmit an account number, the user may be required to click one switch once, then a second switch once, then the first switch twice. Many variations on such a combination of clicks may be provided for.

From the point of view of entering combinations to operate the identification token, five or ten switches may be provided on the token, to allow for entry of a combination as in a mechanical push button combination lock, or to allow entry of a personal identification number (PIN) as in operation of an ATM.

In some embodiments, as described above, the RFID IC may detect the state (open or closed) of one or more switches. In addition or alternatively, the RFID IC may be configured to detect a change in state of one or more switches.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. An identification token comprising:
    a body;
    a radio frequency identification (RFID) integrated circuit (IC) embedded in the body, the RFID IC including a first terminal and a second terminal;
    an antenna embedded in the body and coupled between said first and second terminals of the RFID IC to form two connections between the RFID IC and the antenna; and
    a user-actuatable switch supported by the body and coupled to at least one of the terminals of the RFID IC, the switch having a first state and a second state different from the first state;
    wherein the two connections between the RFID IC and the antenna are uninterrupted such that the antenna is electrically conductively connected to the RFID IC by both connections when the switch is in said first state and are uninterrupted such that the antenna is electrically conductively connected to the RFID IC by both connections when the switch is in said second state;
    wherein said switch is not coupled to the RFID IC by any terminal other than said first and second terminals; and
    wherein the RFID IC detects actuation of the switch and responds to said actuation by selecting between two different payment card account numbers stored in the RFID IC; whereby said actuation functions as an input signal to the RFID IC.

2. The identification token of claim 1, wherein the RFID IC has no terminal other than said first and second terminals.

3. The identification token of claim 1, wherein the switch is coupled to only one of said first and second terminals.

4. The identification token of claim 1, wherein the switch is coupled to both of said first and second terminals.

5. The identification token of claim 1, wherein the switch is a first switch, and further comprising a second user-actuatable switch supported by the body and coupled to at least one of the terminals.

6. The identification token of claim 5, wherein the second switch has a first state and a second state different from the first state of the second switch; and
    wherein the two connections between the RFID IC and the antenna are uninterrupted such that the antenna is electrically conductively connected to the RFID IC by both connections when the second switch is in its first state and are uninterrupted such that the antenna is electrically conductively connected to the RFID IC by both connections when the second switch is in its second state.

7. The identification token of claim 6, wherein said second switch is not coupled to the RFID IC by any terminal other than said first and second terminals.

8. The identification token of claim 6, wherein the second switch is connected in parallel with the first switch.

9. The identification token of claim 6, wherein the second switch is not connected in parallel with the first switch.

10. The identification token of claim 1, wherein the body is card-shaped.

11. The identification token of claim 1, wherein the body is formed of plastic.

12. The identification token of claim 1, wherein the RFID IC stores at least one payment card account number.

13. The identification token of claim 12, wherein the RFID IC stores a plurality of payment card account numbers.

14. An identification token comprising:
    a body;
    an antenna embedded in the body;
    a radio frequency identification (RFID) integrated circuit (IC) embedded in the body, the RFID IC having two and only two terminals, the antenna coupled directly between the two terminals of the RFID IC; and
    a user-actuatable switch supported by the body and coupled to at least one of the terminals;
    wherein the RFID IC detects actuation of the switch and responds to said actuation by selecting between two different payment card account numbers stored in the RFID IC; whereby said actuation functions as an input signal to the RFID IC.

15. The identification token of claim 14, wherein the switch is connected across the antenna.

16. The identification token of claim 14, wherein the switch is connected in parallel with a connection between the antenna and one of the terminals.

17. A proximity payment card, comprising:
a card-shaped body;
an antenna embedded in the body;
a radio frequency identification (RFID) integrated circuit (IC) embedded in the body, the RFID IC having two and only two terminals, the antenna coupled directly between the two terminals of the RFID IC; and
a user-actuatable switch supported by the body and coupled to at least one of the terminals;
wherein the RFID IC stores at least two payment card account numbers; and
wherein the RFID IC detects actuation of the switch and responds to said actuation by selecting among said at least two payment card account numbers stored in the RFID IC; whereby said actuation functions as an input signal to the RFID IC.

18. The proximity payment card of claim 17, wherein the switch is connected across the antenna.

19. The proximity payment card of claim 17, wherein the switch is connected in parallel with a connection between the antenna and one of the terminals.

20. The proximity payment card of claim 19, wherein the switch is a first switch, and further comprising:
a second user-actuatable switch connected across the antenna.

21. A method comprising:
providing an identification token which includes a radio frequency identification (RFID) integrated circuit (IC) having two terminals, an antenna connected to the two terminals and a user-actuatable switch coupled to at least one of the terminals in a manner such that the switch does not disconnect the antenna from the RFID IC when the switch is in an open state; and
said RFID IC detecting a change of state of the switch;
wherein said RFID IC responds to detecting said change of state of the switch by selecting between two different payment card account numbers stored in the RFID IC, whereby said change of state of the switch functions as an input signal to the RFID IC.

22. The method of claim 21, wherein the switch is connected across the antenna.

23. The method of claim 21, wherein the switch is connected in parallel with a connection between the antenna and one of the terminals.

* * * * *